: (12) United States Patent
Yoo et al.

US007693399B2

(10) Patent No.: US 7,693,399 B2
(45) Date of Patent: Apr. 6, 2010

(54) METHOD FOR PROVIDING PROGRAM SPECIFIC INFORMATION RECORDED ON HIGH DENSITY DISC MEDIUM

(75) Inventors: Jea Yong Yoo, Seoul (KR); Byung Jin Kim, Seoul (KR); Soung Hyun Um, Seoul (KR); Kang Soo Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1958 days.

(21) Appl. No.: 10/264,987

(22) Filed: Oct. 3, 2002

(65) Prior Publication Data

US 2003/0033613 A1 Feb. 13, 2003

Related U.S. Application Data

(63) Continuation of application No. 10/181,007, filed on Jul. 11, 2002.

(51) Int. Cl.
*H04N 5/781* (2006.01)

(52) U.S. Cl. ............................ 386/98; 386/83; 386/125; 386/126

(58) Field of Classification Search .................... 386/83, 386/95, 98, 125, 126
See application file for complete search history.

(56) References Cited

U.S. PATENT DOCUMENTS

| 5,754,651 | A  | * | 5/1998  | Blatter et al. ................. 386/83 |
| 6,211,800 | B1 | * | 4/2001  | Yanagihara et al. .... 386/E9.013 |
| 6,266,384 | B1 | * | 7/2001  | Acampora et al. .......... 375/363 |
| 6,456,782 | B1 | * | 9/2002  | Kubota et al. ............... 370/394 |
| 6,473,379 | B1 |   | 10/2002 | Kim et al. |
| 6,741,290 | B1 | * | 5/2004  | Wells ........................... 348/512 |
| 6,879,768 | B1 | * | 4/2005  | Ono et al. ...................... 386/95 |
| 6,947,448 | B2 | * | 9/2005  | Tomita ......................... 370/471 |
| 6,950,604 | B1 |   | 9/2005  | Kato et al. |
| 6,986,159 | B1 | * | 1/2006  | Shimoji et al. ............... 725/142 |
| 7,039,293 | B1 | * | 5/2006  | Aoki ........................... 386/124 |
| 7,076,153 | B2 | * | 7/2006  | Ando et al. .................. 386/125 |
| 7,095,945 | B1 | * | 8/2006  | Kovacevic .................... 386/98 |
| 7,215,671 | B1 | * | 5/2007  | Karasawa ................ 370/395.1 |
| 2003/0033613 | A1 |   | 2/2003  | Yoo et al. |
| 2004/0047612 | A1 | * | 3/2004  | Nagata et al. .................. 386/98 |

FOREIGN PATENT DOCUMENTS

EP        1021048      7/2000

(Continued)

*Primary Examiner*—Vincent Boccio
(74) *Attorney, Agent, or Firm*—Lee, Hong, Degerman, Kang & Waimey (57) ABSTRACT

The present invention relates to method and apparatus of providing data stream together with program specific information (PSI) requisite for data stream selecting, separating, and decoding of a digital TV set. The present invention, when transmitting PSI to a digital TV set, measures time length of the PSI, creates time information preceding a transport time of the first TP belonging to data stream by the measured time length, converts PSI to at least one TP the created time information is added to, and transmits the converted PSI TPs before data stream TPs. Owing to the PSI provided along with a digital data stream, the digital data stream from a recording medium can be selected, separated, and decoded at a digital TV set without data loss. Furthermore, even though PSI is additionally provided, continuity among time information written successive TPs of PSI and data stream is always ensured.

14 Claims, 6 Drawing Sheets

FOREIGN PATENT DOCUMENTS

| | | |
|---|---|---|
| EP | 1033875 | 9/2000 |
| JP | 10-023370 | 1/1998 |
| JP | 11-045512 | 2/1999 |
| JP | 11-234613 | 8/1999 |
| JP | 11-252471 | 9/1999 |
| JP | 2000-231758 | 8/2000 |
| JP | 2000-236499 | 8/2000 |
| JP | 2000-268537 | 9/2000 |

* cited by examiner

Area 2 | Area 1

Navigation Data & concentrated PSI | Data Stream only

FIG. 5

| PSI_GI : PSI General Information | |
|---|---|
| VERN | Version Number |
| ⋮ | ⋮ |
| PCR_offset | PCR offset value of the first TP of data stream |
| Reserved | Reserved |

METHOD FOR PROVIDING PROGRAM SPECIFIC INFORMATION RECORDED ON HIGH DENSITY DISC MEDIUM

This is a continuation of application Ser. No. 10/181,007 filed Jul. 11, 2002, which application is hereby incorporated by reference in its entirety.

1. TECHNICAL FIELD

The present invention introduces the method and apparatus of providing data stream read from an information recording medium, such as a high-density digital versatile disc (HDVD), for a digital television set. In addition, it showcases a requisite program specific information (PSI) in order for a digital television set to select, separate and decode the digital data stream.

2. BACKGROUND ART

In today's world, a digital television (TV) set presenting high-quality pictures via a digital TV broadcast signal is gradually gaining popularity. The digital TV broadcast signal received by the digital TV set contains not only digital video and audio data but also intermittently inserted PSI to provide a variety of information about broadcast programs. The PSI is also referred to as PSIP (Program System Information Protocol).

The digital TV set selects a channel, then separates and decodes digital stream of the selected channel to match pictures and sound with reference to the intermittently received PSI.

Figure 1:
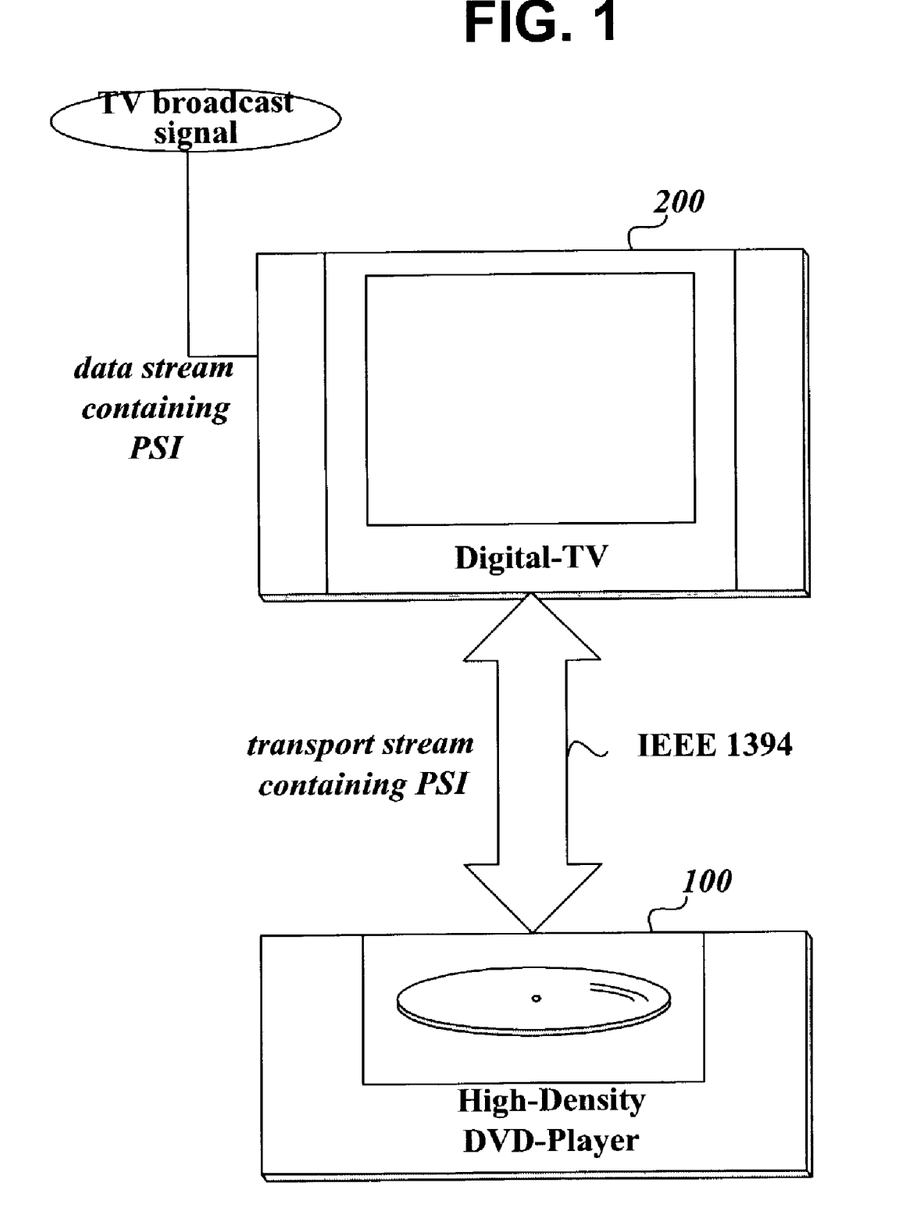
FIG. 1 shows a disk reproducing device and a digital TV set connected to each other.

In the meantime, a high-density disk device, being developed to reproduce a HDVD with its recording standard under discussion, is expected to be connected to a digital TV set through IEEE 1394 standard as shown in FIG. 1. However, when receiving and presenting the data stream from the disk device 100, the digital TV set 200 still requires PSI to select the data stream and to control presentation of the selected data stream.

Figure 2:
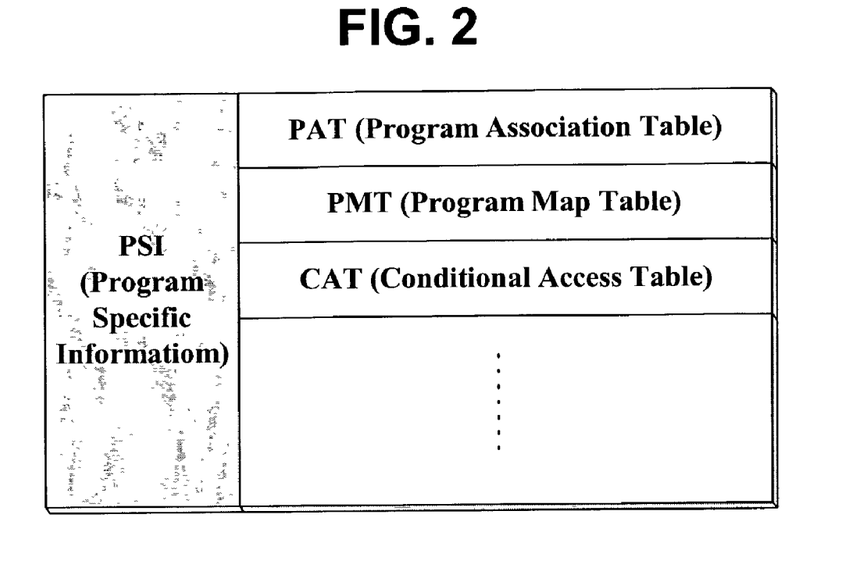
FIG. 2 shows several elements constituting program specific information (PSI)

Therefore, when the disk device 100 reproduces MPEG-formatted data stream recorded on a HDVD and sends it to the digital TV set 200 connected through a digital interface such as IEEE 1394 standard, it must provide a PSI. For a digital TV set 200 in the format of transport stream (TS) consisting of 188-byte-long transport packets (TPs), a PSI may consist of a program association table (PAT), a program map table (PMT), a conditional access table (CAT) and so forth as shown in FIG. 2.

Figure 3:
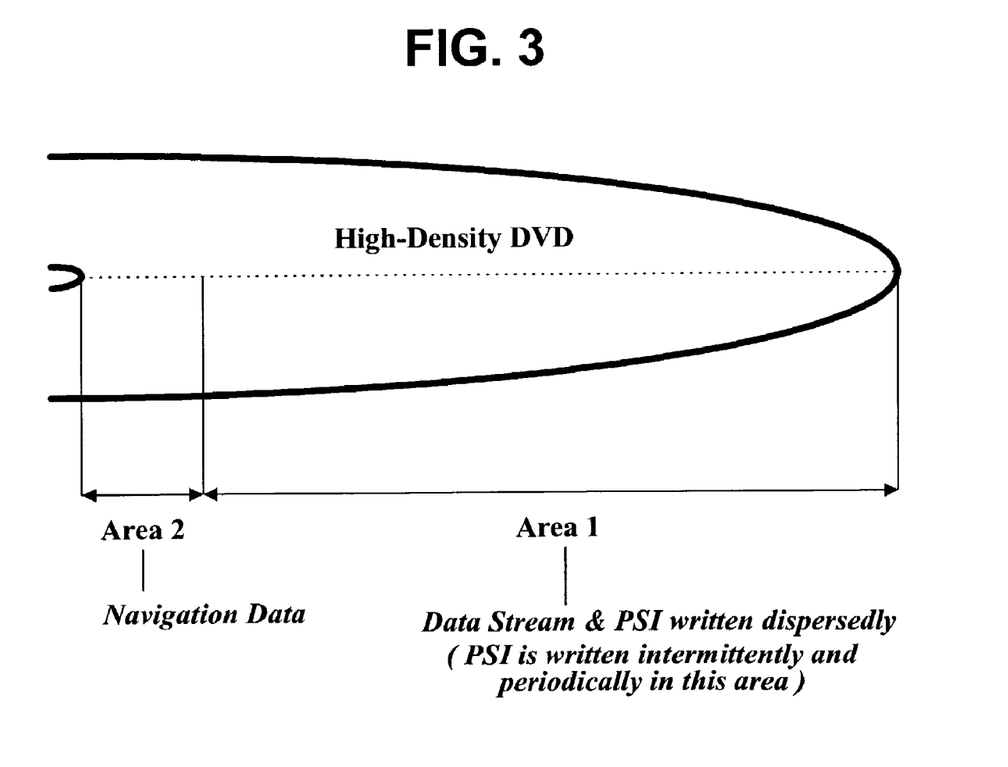
FIG. 3 shows partitioned recording areas of a disk, recording medium and contents to be recorded thereon.

To periodically feed the digital TV set with PSI for recorded data stream via a digital TV broadcast signal, the PSI is recorded dispersedly and repeatedly in a data recording area (i.e. 'AREA 1') on a HDVD as shown in FIG. 3, and the repeatedly written PSI is retrieved and transmitted sequentially along the data stream.

However, if PSI is recorded dispersedly and repeatedly on a data recording area of a disk, the recording area for a real data, namely video and/or audio data, is greatly reduced, decreasing the recording efficiency of a disk.

In addition, the digital TV set cannot present the received data stream until it receives PSI retrieved in regular sequence from the PSI recorded dispersedly in the data recording area. This is despite the fact that data reception is resumed after a reproduction point is moved according to a key command of a user or a digital interface, such as after the IEEE 1394 standard is reset. Because the digital TV set cannot select data stream to decode real pictures and/or sound until the PSI, which is prepared for the data stream, is received inevitably there is a temporary discontinuity in video and/or audio.

In the meantime, the digital TV set determines when to decode and present TPs received based on PCRs (Program Clock References) intermittently in the TPs. Thus, if PCRs are discontinuous, errors might occur in decoding and presenting received TPs. Accordingly, to prevent such possible malfunction, PSI time information must be in sync with the PCRs. PCRs are included in consecutive TPs and contain real data when PSI is converted to TPs and inserted into TS of real data.

3. DISCLOSURE OF INVENTION

The object of the present invention is to provide a PSI method, which enables a connected digital TV set to present video pictures and/or sound with stability.

Another object is to provide a PSI recording method and a recording medium, allowing a digital TV set to present video pictures and/or sound with stability.

A third object is to provide an information recording/reproducing apparatus enabling a connected digital TV set to present video pictures and/or sound with stability.

A PSI method and an apparatus conducting said method in accordance with the present invention can be described as transmitting the TPs made of PSI prior to data stream transmission whenever data stream begins transmission. Further, they measure the length of time of PSI transmission, create time information preceding a transport time of the first TP among data stream according to the measured time length, convert PSI to at least one TPs where the created time information is written in, and transmit the converted PSI TPs before the data stream TPs.

Using the PSI method and other apparatus in accordance with the present invention, a digital TV can synchronize its local clock with the time written in the PSI TP or TPs received, and can also decode and interpret PSI TPs after synchronization. Thereafter, it can successively separate and decode data stream TPs without missing any TP. Therefore, even though PSI is an addition for a digital TV set, time information written in successive TPs of PSI and data stream ensure continuity and accuracy of time so that possible data loss, which might result from time discontinuity, is prevented.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

In the drawings.

5. MODES FOR CARRYING OUT THE INVENTION

In order to aid in fully understanding the present invention, preferred embodiments will now be described with reference to the accompanying drawings.

Figure 4:
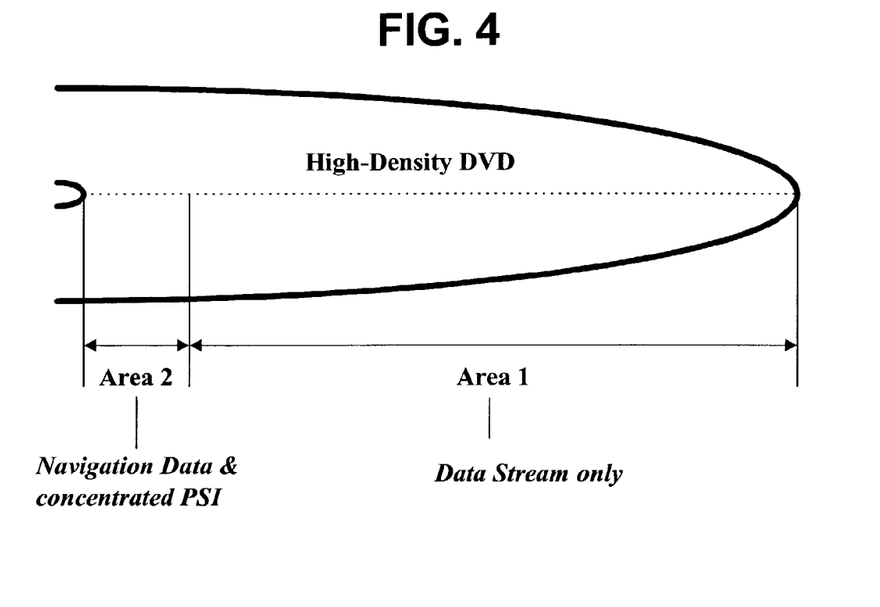
FIG. 4 shows partitioned recording areas of a disk recording medium and contents to be recorded thereon according to the present invention.

FIG. 4 is a partitioned area of a HDVD capable of supporting a PSI transmitting method in accordance with the resent invention.

The HDVD of FIG. 4 has two recording areas, 'AREA 1' and 'AREA 2'. First, 'AREA 1' is used to store real data, such as video and/or audio data, which is unitized by stream object unit (SOBU). Next, 'AREA 2' is used for managing information, such as navigation data, which is used for controlling reproduction and presentation of recorded SOBUs constituting a stream object (SOB) which usually corresponds to a single program or digital stream section recorded continuously from start to finish.

As shown in FIG. 4, all of PSI, which will be accessible from a digital TV set connected through a digital interface such as IEEE 1394 to select a data stream from a disk player and to decode the selected stream, is compactly written in the management information recording area (i.e. 'AREA 2') without repetition, so that the storage capacity of the data recording area (i.e. 'AREA 1'), prepared for video and/or audio data, is not decreased.

To compactly record PSI, following procedures are conducted sequentially.

First, PSI, which consists of PAT, PMT, CAT, etc mentioned above in reference to FIG. 2, is inserted intermittently in a digital TV broadcast signal and it is detected and separated from the received digital TV broadcast signal. Each separated PSI is processed into a digital stream adequate to record the format of a writable HDVD. At the same time, each separated PSI is compared with previously detected PSI to recognize whether the separated PSI is new, namely whether the separated PSI contains data different from that of the previous PSI. If the separated PSI is new, it is sequentially written on the management information area (i.e. 'AREA 2') of the writable HDVD.

When each PSI is written, an information link between the written PSI and a SOB is created and appended to each written PSI. The information link consists of beginning and ending time of a corresponding SOB.

When each PSI is processed, control information for various presentations related to a specific data stream provided from a recording medium may be added to PSI besides PAT, PMT, and CAT information. Furthermore, some fields of PSI may be replaced for better presentation of recorded data stream apart from the broadcast data stream.

Figure 5:
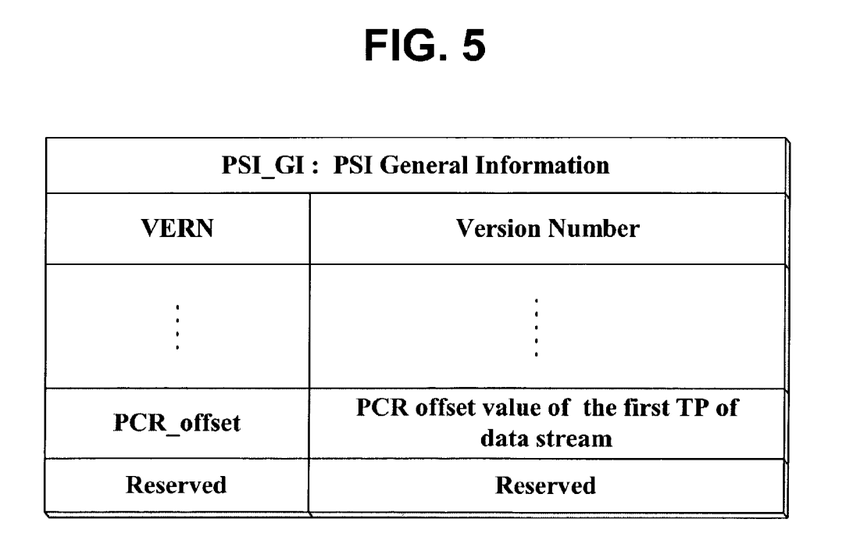
FIG. 5 shows general PSI information for managing all PSI concentrated in an area of a recording medium.

FIG. 5 shows PSI information for generally managing all PSI, written compactly on 'AREA 2' of a HDVD. As shown in FIG. 5, a PCR offset field marked 'PCR_offset' is added to the PSI general information. The PCR offset field shall be filled with time length of TPs, each payload containing a PSI. Thus, the first TP belonging to PSI TPs has time information preceding a transport time (or PCR) of the first TP among data stream TPs, which will be transmitted after PSI TPs according to the time length written in the field 'PCR_offset'.

For example, if it is assumed that 500 is written in the PCR offset field the first TP, including partial PSI which will be followed by TPs of data stream, it has time information of a transport time 'TT1' (or PCR) or the first TP of data stream subtracted by 500, namely 'TT1−500'. If PSI is transmitted twice prior to data stream transmission, the time information for the first TP of PSI transmitted first is 'TT1−500×2,' and the time information for the first TP of PSI transmitted second is 'TT1−500×1'. Generally speaking, if PSI is to be provided N times, then the time information for the first TP of PSI transmitted at M-th is 'TT1−500×(N−M+1)'.

Accordingly, the time information included in PSI TP or TPs is always in sync with data stream TPs following the PSI TPs, so that a digital TV set can synchronize its local clock with time information written in a TP or some TPs of PSI received before data stream TPs, and to decode and interpret PSI TPs received after synchronization. Afterwards, it can successively separate and decode data stream TPs without missing any TP.

Figure 6:
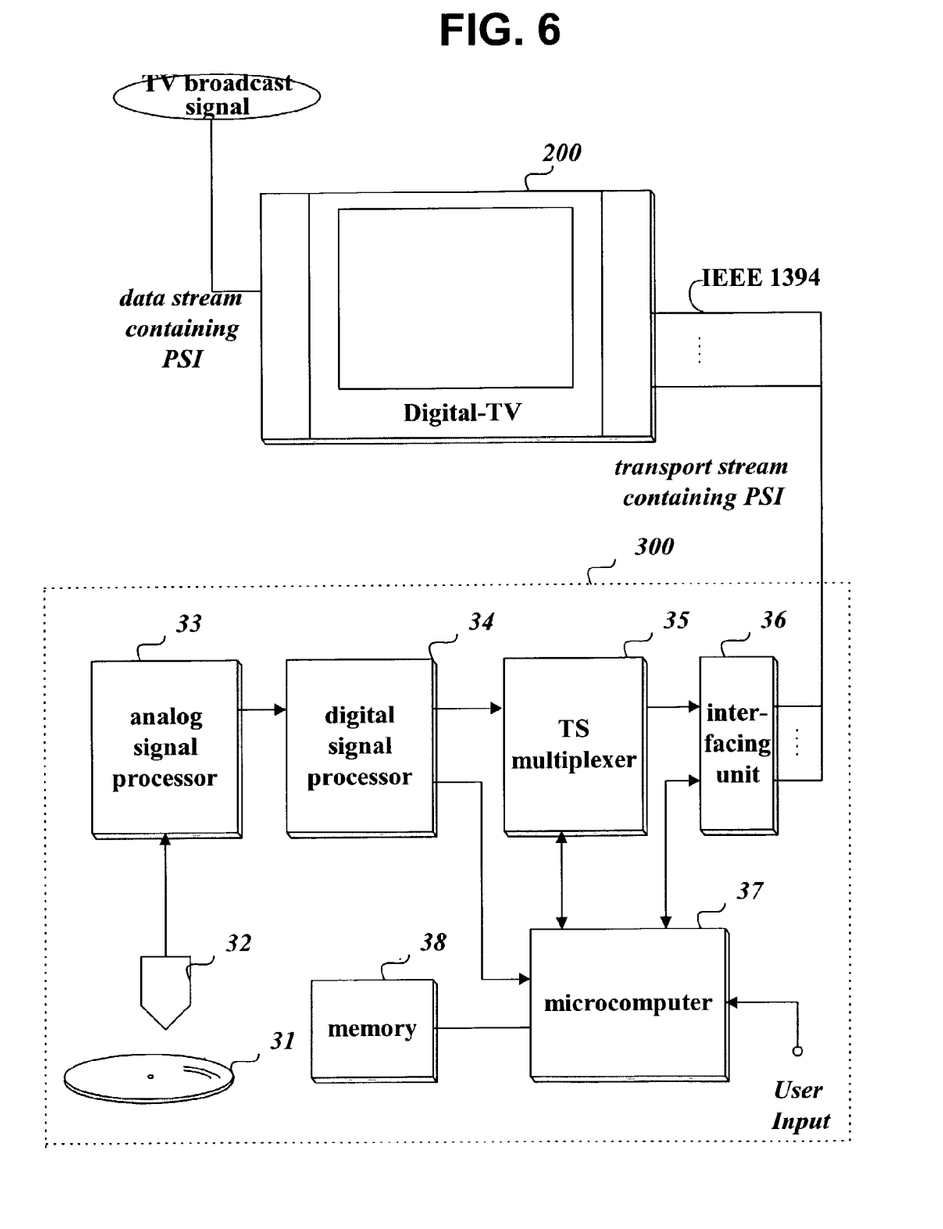
FIG. 6 is a block diagram of a disk device to conduct a method of providing data stream together with PSI in accordance with the present invention.

FIG. 6 is a block diagram of a disk device, such as a HDVD player, to provide a data stream together with PSI in accordance with the present invention.

The disk device 300 shown in FIG. 6 comprises an optical pickup 32 detecting recorded signals of a HDVD 31 having PSI compactly written in the area 'AREA 2'; an analog signal processor 33 processing the electrical signal from the pickup 32 and converting it to a binary signal; a digital signal processor 34 processing the binary signal to obtain real data and PSI; a TS multiplexer 35 multiplexing the real data and PSI and converting the multiplexed data onto TS; an interfacing unit 36 transmitting the TS to a digital television 200 connected through IEEE 1394 standard; a microcomputer 37 supervising the overall reproduction operation; and a memory 38 for storing temporary data produced during disk reproduction.

In the disk device 300 configured in FIG. 6, the microcomputer 37 conducts an operation to provide PSI, which is associated with the present data stream being reproduced, for the digital TV set 200. To do so, first it reads the PSI from the management information recording area (i.e. 'AREA 2') when a key command is entered directly from a user. Then a packet command is received from the digital TV set 200 connected through IEEE 1394 standard, or a bus reset on the IEEE 1394 might occur. Subsequently, the digital TV set 200 interprets the PSI received before data stream through the IEEE 1394 bus and selects and decodes data stream based on the interpretation of the PSI. This, which was briefly mentioned above, is further explained below in detail.

Figure 7:
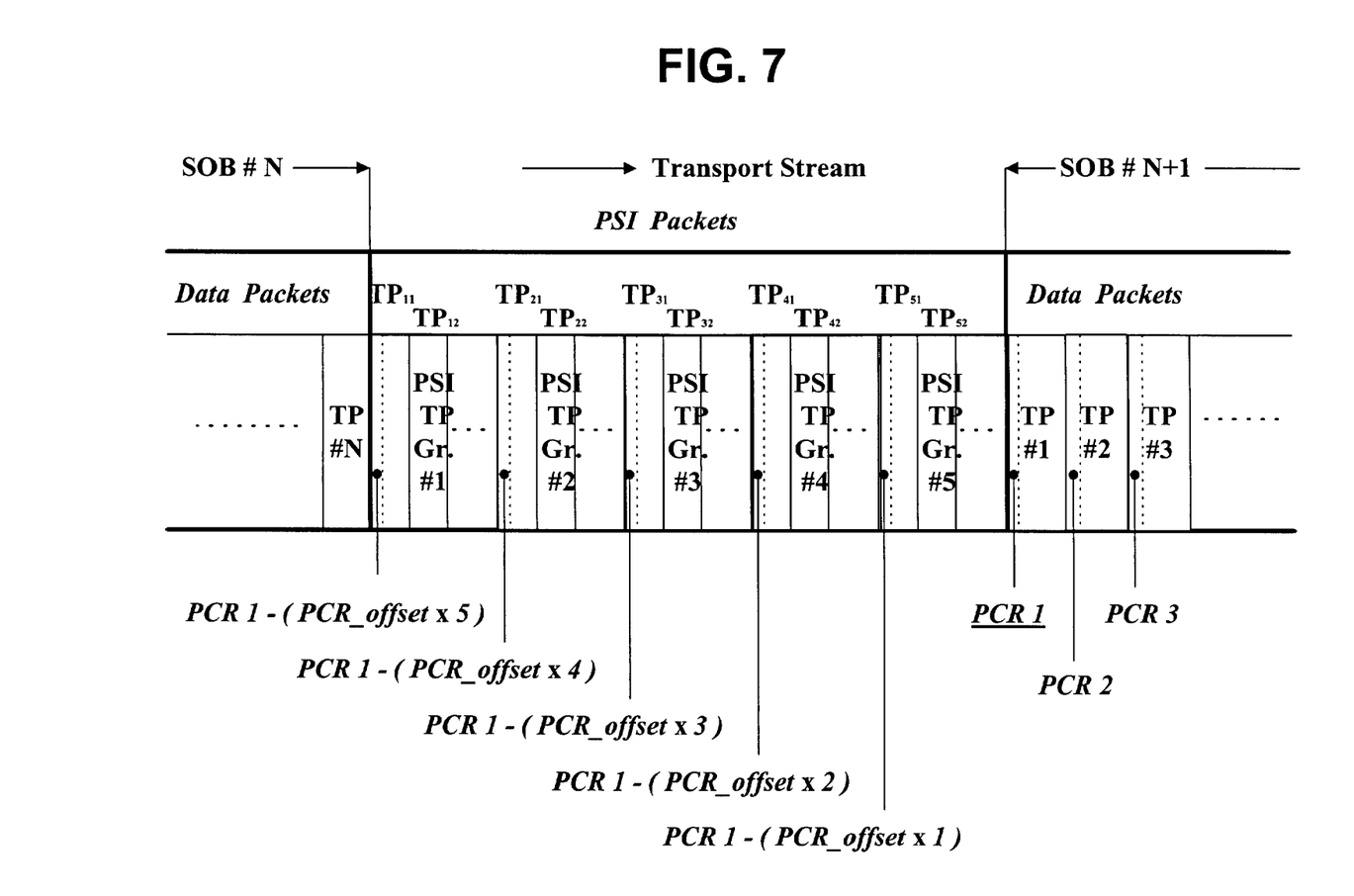
FIG. 7 is an illustrative format of stream transmitted to a connected digital TV set.

FIG. 7 is an illustrative format of stream transmitted to a connected digital TV set. To transmit PSI and data stream like as shown FIG. 7, the microcomputer 37 checks whether reproduced data is changed to next SOB during reproduction of the HDVD 31. If changed from the N-th SOB to the (N+1)-th, the microcomputer 37 reads the PSI associated with the (N+1)-th SOB from the area 'AREA 2' and applies the read PSI to the TS multiplexer 35 which converts the inputted PSI to a TP or several TPs (called 'TP Group') if necessary. The TS multiplexer 35 will transmit the converted TP or TP Group before the first TP belonging to the (N+1)-th SOB under control of the microcomputer 37.

It is preferable to provide the PSI TP or TP Group repeatedly more than once to prevent possible errors in transmitting and/or receiving data. The example in FIG. 7 is illustrates a case where the PSI transmission is conducted five times before data stream and it is carried by a plurality of TPs, namely, a TP Group.

To transmit PSI five times, the microcomputer 37 reads the PCR offset field of the PSI general information and transports time information or PCR written in the first TP of the SOB # (N+1). Then, it calculates each time information for the first TP of each PSI TP Group using the offset value and transport time (or PCR) read.

The five-time information, 'PCR1−(PCR_offset×5)', 'PCR1−(PCR_offset×4)', 'PCR1−(PCR_offset×3)', 'PCR1−(PCR_offset×2)', and 'PCR1−(PCR_offset×1),' are obtained from the calculation of the microcomputer 37 if the transport time information or PCR written in the first TP of the SOB # (N+1) is 'PCR1'. These information are written in the first TP of each PSI sequentially from the time 'PCR1−(PCR_offset×5)'.

Because the same PSI is provided several times, even if the first and the second PSI totally fail and an internal clock of the digital TV set is synchronized with the time information of the first TP of the third PSI, data stream information can be obtained from interpreting the successfully received TPs of the fourth and the fifth PSI. Therefore, the digital TV set can select data stream following the PSI TPs and separate and decode the selected data stream based on the interpretation of PSI.

Besides, at the time when a reproduced program is changed, namely when next SOB starts reproducing, the PSI is also accessible from the digital TV set before the data stream in the following cases where:

a) the data stream is transmitted for the first time;

b) there is a long track jump in which reproduction position on a recording medium is largely changed and is conducted at a request from user's key input;

c) a microprocessor 37 receives a command about the disk device 300 through the digital interface when the digital TV set 200 connected with the disk device 300 through the IEEE 1394 standard is turned on or its channel is changed; and d) the connecting interface between the disk device 300 and the digital TV set 200 is reset.

In the above embodiment of the present invention, a HDVD is used as a recording medium. However, the present invention is also applicable, without any modification and variation, to a video recording/reproducing apparatus of a magnetic recording medium on which video contents are recorded in digital data stream.

If a recording medium does not have a PSI unlike the aforementioned HDVD containing PSI, a reproducing apparatus may create PSI itself and transmit it to a digital TV set before reproduced data stream as explained above.

For example, if a disk inserted in the disk device in FIG. 6 is a conventional DVD having no PSI, the microcomputer 37 creates a TP or TPs of PSI, which may be preferred for parsing digital data stream into video and audio stream, using basic PSI-related information pre-stored in the memory 38. It then inserts time information, which is obtained from the above-explained time calculation method, in the PSI TP or TPs. Thus created PSI TPs, including time information, is accessible from a connected digital TV set before reproducing data stream when data stream is transmitted for the first time or when a command related with an event that the connected digital TV set is turned on or its channel is changed, is received.

Figure 8:
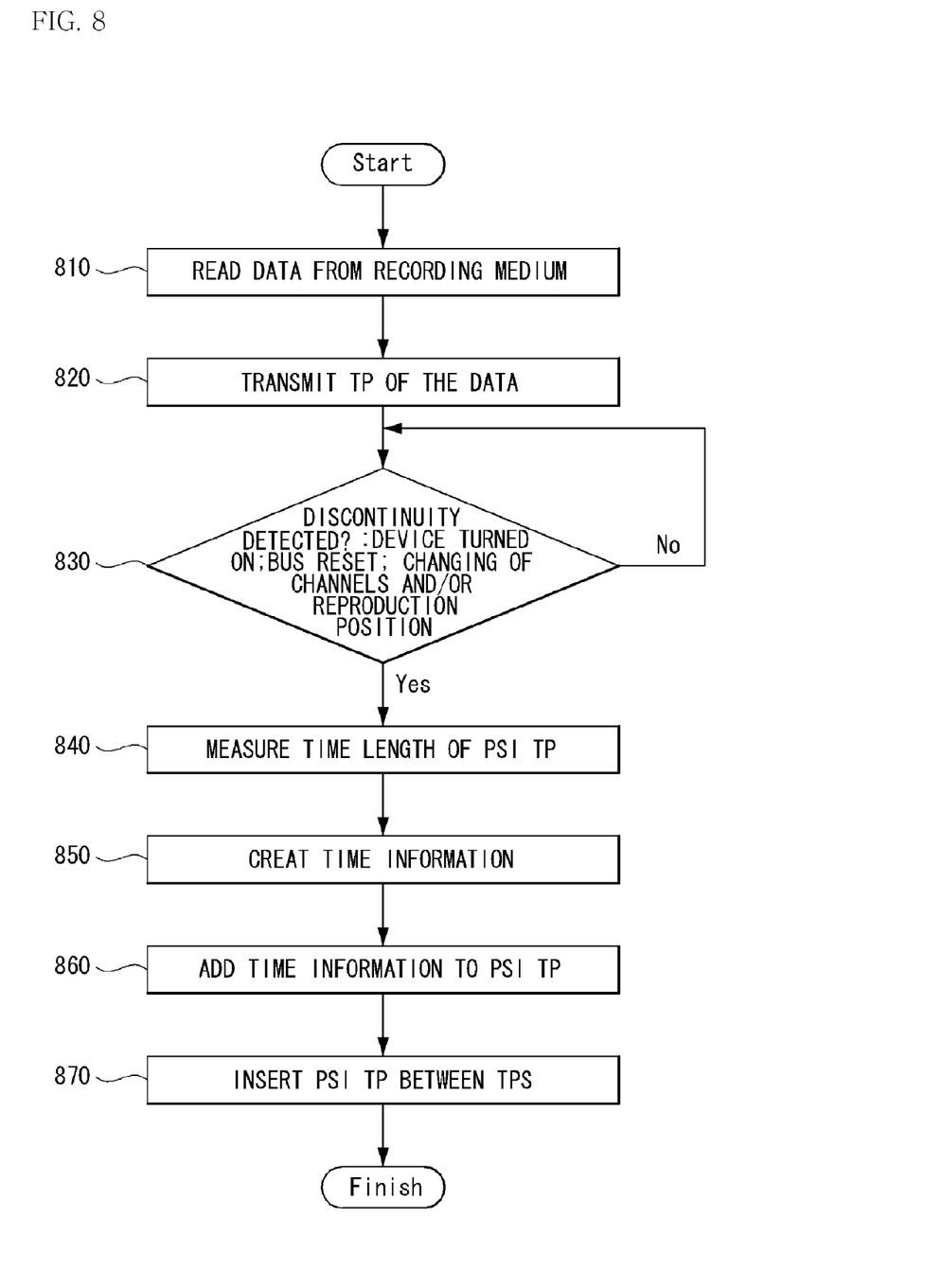
FIG. 8 illustrates a flow chart for inserting a PSI TP between Transport Packets according to an embodiment of the present invention.

FIG. 8 illustrates a flow chart for inserting a PSI TP according to an embodiment of the present invention.

As illustrated in FIG. 8, data is read from a recording medium (810) and the TP of the data is transmitted (820). Accordingly, the TP of the data is transmitted until a discontinuity in the TP is detected (830). Examples of events that may cause a discontinuity may include turning on a device, resetting a bus, changing a channel, or changing a reproduction position on the recording medium (830). Once a discontinuity is a detected, a time length of the PSI TP is measured (840) and time information is created (850) according to the measured time length of the PSI TP. Thereafter, time information is added to the PSI TP (860) and the PSI TP is inserted in between TPs (870).

The invention claimed is:

1. A method of providing information tables for a connected device when transmitting data to the connected device in transport stream (TS) format, the method comprising:

reading data from a recording medium;

transmitting at least one transport packet (TP) of the read data in a transport stream;

detecting parts of the transport stream if partial transport stream discontinuity occurs; and inserting at least one information table transport packet (TP) comprising an information table between the parts of the transport stream where the partial transport stream discontinuity occurs to transmit the at least one information table TP in the transport stream.

2. The method of claim 1, wherein inserting the at least one information table TP comprises:

measuring time length of the information table TP;

creating time information preceding a transport time of a first data TP of the part of the transport stream to be transmitted after the information table TP by the measured time length;

adding the created time information to the information table TP; and transmitting the information table TP including the time information to the connected device before transmitting the first data TP.

3. The method of claim 2, wherein the time length is recorded in a management information area allocated for managing the information table.

4. The method of claim 1, wherein inserting the at least one information table TP creates at least two TPs comprising the information table and transmits all created information table TPs before the first TP containing data.

5. The method of claim 1, wherein the transmission discontinuity occurs when a data reproducing position on the recording medium is changed.

6. The method of claim 1, wherein the transmission discontinuity occurs when the connected device is turned on.

7. The method of claim 1, wherein the transmission discontinuity occurs when a new stream object is transmitted after a stream object being reproduced is changed.

8. The method of claim 1, wherein the transmission discontinuity occurs when a data bus carrying the at least one information table TP and the data TPs to the connected device is reset.

9. The method of claim 1, wherein the transmission discontinuity occurs when a receiving channel of the connected device is changed.

10. An apparatus for providing information tables for a connected device when transmitting data to the connected device in transport stream (TS) format, the apparatus comprising:

a memory unit configured to store data;

a reading unit configured to read data from a recording medium and store the read data in the memory unit; and a controlling unit configured to transmit at least one transport packet (TP) of the read data in a transport stream, detect parts of the transport stream if partial transport stream discontinuity occurs, and insert at least information table transport packet (TP) comprising an information table between the parts of the transport stream where the partial transport stream discontinuity occurred to transmit the at least one information table TP in the transport stream.

11. The apparatus of claim 10, wherein the controlling unit writes time information preceding a transport time of a first data TP of the part of the transport stream to be transmitted after the information table TP before transmitting the information table TP to the connected device.

12. The apparatus of claim 10, wherein the controlling unit transmits at least two information table TPs before transmitting the first data TP.

13. The apparatus of claim 10, wherein the controlling unit creates the at least one information table TP based on information pre-recorded on the recording medium.

14. The apparatus of claim 10, wherein the controlling unit creates the at least one information table TP based on information pre-written on an information storage medium other than the recording medium.

* * * * *